July 7, 1959   H. M. OLSON   2,893,798
PISTON RING AND EXPANDER
Filed Oct. 22, 1956
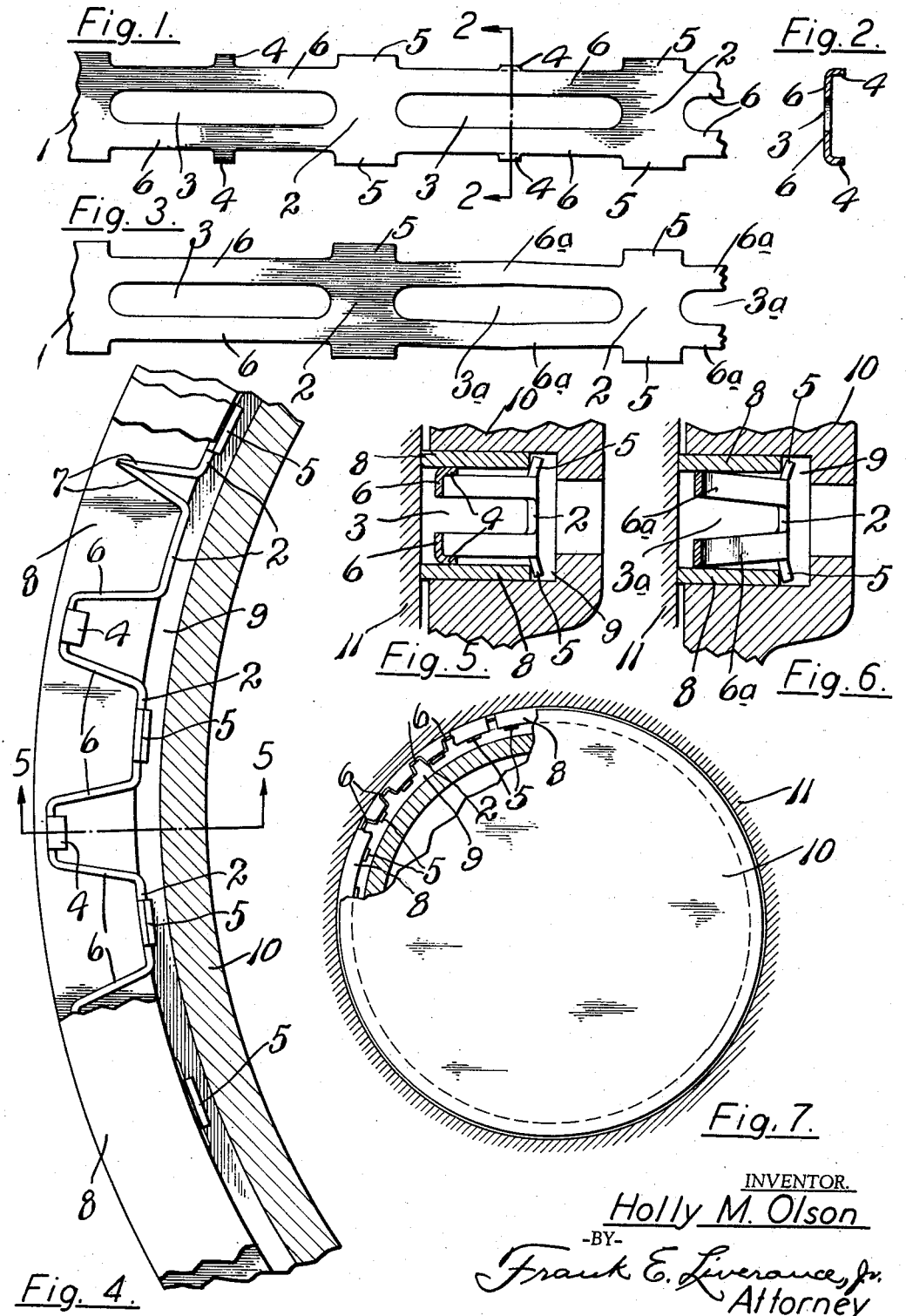
INVENTOR.
Holly M. Olson
BY Frank E. Liverance, Jr.
Attorney United States Patent Office 2,893,798
Patented July 7, 1959

2,893,798

PISTON RING AND EXPANDER

Holly M. Olson, Muskegon, Mich., assignor to Sealed Power Corporation, Muskegon, Mich., a corporation of Michigan Application October 22, 1956, Serial No. 617,505

8 Claims. (Cl. 309—44)

The present invention relates to a novel piston ring which, basically, includes two thin, parted, circular steel rails one adapted to be against the upper and the other against the lower side of a piston ring groove, between which is a novel expander of the circumferentially expansible type. Such three members comprise the piston ring and fill the piston ring groove axially. The ring is of the kind known as an oil ring, that is, one which is installed in a lower groove of a piston, the function of which is to salvage lubricating oil, remove excess oil and drain it to the interior of the piston.

Oil ring grooves in automotive pistons are machined to establish tolerances as to axial dimensions or widths and the parts which make up the piston ring, that is, the two thin steel rails and the expander also have manufacturing tolerances so that when an installation of a three-part oil ring, including the rails and spacer between them, takes place, the tolerances may accumulate and the ring be too loose, but must never be so that the ring is tight in the groove. The result is that frequently there is a loose and variable fit of the ring in the groove. In the operation, with the rapid reciprocation of the piston, such loose fit is unsatisfactory as the rails, particularly at their outer portions, flutter and change position which flutterings thereof cause objectionable noises and also may cause battering of the sides of the ring grooves, particularly at their outer portions, widening them. When such widening occurs the results become progressively unsatisfactory.

With the present invention irrespective of variable and/or accumulative tolerances occurring the rails are held snugly against their associated ring groove sides with a yielding spring pressure, not tight but resilient and yielding, so that the movements of the rails at their outer edges against the cylinder walls is not impeded or otherwise undesirably affected.

An understanding of the invention may be had from the following description, taken in connection with the accompanying drawing, in which, Fig. 1 is a plan view of a section of the flat stock from which the spacer is made illustrating the first two steps in the structure of said spacer.

Fig. 2 is a vertical section substantially on the plane of line 2—2 of Fig. 1.

Fig. 3 is a plan view similar to Fig. 2 showing an alternative form of the spacer.

Fig. 4 is a fragmentary, much enlarged, plan of the spacer when completed in corrugated form, in the form shown in Figs. 1 and 2, with an associated horizontal section through a piston at the oil ring groove therein illustrating the position of the rails, the upper one of which is broken away for better disclosure of the spacer expander structure.

Fig. 5 is an enlarged fragmentary vertical section on the plane of line 5—5 of Fig. 4.

Fig. 6 is a like vertical section showing the expander in the alternative form as it is made from the stock shown in Fig. 3, and Fig. 7 is a plan of a piston equipped with such ring, having a portion at one side broken away and with parts removed, the piston being in a surrounding cylinder.

Like reference characters refer to like parts in the different figures of the drawing.

With my invention the expander is made from a length of flat ribbon stock 1 which is punch press processed to leave at spaced distances in the length thereof sections 2. Between successive sections 2 are elongated slots 3 midway between the opposite longitudinal edges of the ribbon stock 1. There is also cut therefrom at such opposite edges shallow elongated recesses which do not extend the full length between the sections 2, but midway between such sections there are left short outwardly projecting tongues 4. The sections 2 at the edges of the stock are not machined at all so that there are left lips 5 of the width of the sections 2. The connecting parts between the sections 2, one at each side of each slot 3, are indicated at 6 and are of a length sufficient that in the subsequent corrugating of the strip the sections 2 form inner crowns while the sections 6 form not only the outer crowns but the spaced crown connecting legs of the corrugations.

A length of such stock sufficient for a ring spacer as thus processed is corrugated horizontally as best shown in Fig. 4 after the tongues 2 have been bent and flattened inwardly, as in Fig. 2, so that the upper and lower sides of the upper and lower tongues are in planes below and above, respectively, the edges of the lips 5. The sections 6 are bent and formed into substantially U-shape, making a corrugated spacing member which is shaped into a generally circular form, the ends of which come together and abut as at 7 in Fig. 4. Such spacer is initially greater in circumference than it will be when it has been circumferentially compressed and shortened on installation in an engine cylinder. Such circumferential compression and reduction in circumference of the spacer sets up expanding forces tending to cause the spacer to resume the larger circumference which it has when free.

With such spacer, upper and lower circular parted thin rails 8 are used, one above and the other below the spacer. The rails and the spacer are installed in an oil ring groove 9 of a piston 10. The lips 5 are bent at a slight angle to the vertical inwardly and upwardly for the upper lips and inwardly and downwardly for the lower lips as shown in Figs. 5 and 6. The U-shaped corrugations extending outwardly from each of the inner crowns have the slot 3 extend the full length of the corrugations between the inner crowns 2, thus such corrugations are resistingly yieldable in an axial direction. When installed in a piston, as in Fig. 5, and the piston with the ring therein within a cylinder 11 the expansive force of the spacer expander member imparted through the lips 5 to the inner edges of the rails 8 forces the rails outwardly for their outer edges to bear with a desired unit pressure against the cylinder walls, and also through the wedging action of the inclined lips against the inner edges of the rails causes the rails to snugly engage the sides of the ring groove 9.

The projections 4 turning inwardly as shown to provide upper and lower pads as in Fig. 5, increase the axial dimensions of the corrugations at their outer portions so that normally the total axial dimension of the ring from the outer side of one rail to the outer side of another is slightly greater than the width of the ring groove.

Under such conditions the rails when inserted bear snugly against the upper and lower sides of the ring groove at their outer portions and also against the pads 4 and press the parts of the corrugations above and below slots 3 toward each other. Such strain and deformation of the outwardly extending corrugations will amount to but a few thousandths of an inch but is sufficient to insure the snug engagement of the outer sides of the rails at their outer portions against the ring groove sides under all operating conditions, while of course the inner portions of the rails are held snugly against the inner parts of the sides of the ring groove through the action of the inclined lips 5.

In the form shown in Figs. 3, 6 and 7, the projections or pads 4 are not used. In the second step of processing the ribbon stock in Fig. 3 after the slots 3 with parallel sides have been cut leaving the sections 6 between the sections 2, the slot is widened at its intermediate portion substantially midway between its ends, bowing out the sections 2 as at 6a and thereby providing slots 3a, widest at their middle portions and progressively decreasing at their ends while the sections 6 have their greatest width between their outer edges at their middles and progressively decrease to the sections 2 with which integrally connected.

When the corrugations are made in the same manner as before, the inner crowns 2 with the inclined lips 5 are the same but the widest middle portion of the slot 3a is at the outer portions or outer crowns of the corrugations, the slots progressively widening outwardly from the inner crowns 2 as shown in Fig. 6. This widening is sufficient that when the rails are installed with the spacer in the groove 9 of the piston 10, the rails bear snugly against one side of the piston ring groove and flex or strain the outer portions of the corrugations 6 toward each other, being permitted by the slot 3 extending the full length of the corrugations and the legs and the outer crowns thereof. Therefore, there is the pressure exerted upon the rails at their outer portions with sufficient force to maintain the rails snugly against the sides of the ring grooves or at the points close to the cylinder bore insuring a firm but resilient pressure at the inner as well as the outer edges of the rails against the sides of the ring groove. There is a firm holding and retaining of the rails preventing rail flutter and its objectionable noise and other undesirable results coming therefrom.

Both forms are practical, useful and, under extensive test and trial, have proven very satisfactory. Commercial production thereof in large quantity is continuous.

The invention is defined in the appended claims and is to be considered comprehensive of all forms of structure coming within their scope.

I claim:

1. A piston ring comprising two thin, metal, circular parted rails and a corrugated, metal, parted, circumferentially compressible spacer between the rails, said spacer having circumferentially spaced inner crowns and circumferentially spaced outer crowns, each inner crown being connected with the next adjacent outer crowns on opposite sides thereof by a pair of legs, said legs and the outer crowns being slotted between the upper and lower edges thereof, each of said slots extending continuously from one vertical side edge of one inner crown to the adjacent vertical side edge of the adjacent inner crown so that the spacer is slotted between its upper and lower edges substantially throughout its circumferential extent except at said inner crowns, whereby the portions of said spacer lying radially outwardly of the inner crowns are vertically flexible and yieldable and adapted to resiliently press the outer portions of the rails against the sides of a piston ring groove in which the piston ring is placed.

2. A piston ring as defined in claim 1, said inner crowns at upper and lower ends having extensions beyond said legs forming upper and lower lips bearing against the inner edges of said rails, and means at the upper and lower edges of the outer crowns for spacing said rails farther apart than the distance between the upper and lower edges of said legs where connected to said inner crowns.

3. A piston ring as defined in claim 1, said inner crowns at upper and lower ends having extensions beyond said legs providing upper and lower inwardly inclined lips bearing against the inner edges of said rails, said outer crowns having the upper and lower parts thereof above and below the slots therein spread apart a greater distance than said legs at their points of connections to said inner crowns.

4. A piston ring as defined in claim 1, said inner crowns at upper and lower ends having extensions beyond said legs providing upper and lower lips bearing against the inner edges of said rails, and each of said outer crowns at upper and lower edges having pads integral therewith against which said rails engage at their inner sides, said pads located outwardly beyond the adjacent edges of said legs.

5. A piston ring adapted for installation in a piston ring groove of a predetermined axial width as close as normal machine tolerances permit comprising, two thin, parted, circular, metallic rails adapted to bear at outer sides, one against each side of said ring groove, and a circular, parted, corrugated spacer between said rails having corrugations with inner and outer crowns connected by legs, said legs and outer crowns having continuous slots therein extending from the side edges of each inner crown to the side edges of the next adjacent inner crowns, each inner crown at each end thereof having an integral inwardly inclined lip beyond the adjacent edges of said legs against which said rails bear at their inner edges thereby moving said rails at inner portions to seal against sides of a ring groove in which placed, and said outer crowns, divided by said slots, being adapted to resiliently press said rails at outer portions thereof against said sides of the ring groove in which placed.

6. A piston ring as defined in claim 5, said slots in the outer crowns and legs connected thereto being widest in said outer crowns, and progressively diminishing in width through said legs to the inner crowns.

7. In combination, a piston having a ring groove around it, a circular, parted, thin metallic flat rail against each side of said groove, a circular parted, corrugated, circumferentially compressible spacer between the rails, said spacer comprising inner and outer crowns connected by two legs, and said outer crowns and legs connected therewith having elongated slots between the opposite edges thereof extending, each, from one side of an inner crown for the length of an adjacent leg, the outer crown connected therewith and the other connected leg to the edge of an adjacent inner crown, means on said inner crowns bearing against the inner edges of said rails, and said outer crowns at opposite edges bearing against the inner sides of the outer portions of said rails for resiliently pressing the rails against adjacent sides of said groove.

8. The combination of elements defined in claim 7, said outer slotted crowns and legs connected thereto comprising, upper and lower parts spaced from each other yieldingly resisting strain thereof toward each other.

References Cited in the file of this patent

UNITED STATES PATENTS

| 2,229,578 | Malpas | Jan. 21, 1941 |
| 2,695,825 | Estey | Nov. 30, 1954 |
| 2,744,803 | Marien | May 8, 1956 |
| 2,789,872 | Olson | Apr. 23, 1957 |
| 2,795,469 | Haling | June 11, 1957 |